(12) United States Patent
Dries et al.

(10) Patent No.: US 7,964,157 B2
(45) Date of Patent: Jun. 21, 2011

(54) CATALYTIC CRACKING RISER REACTOR

(75) Inventors: Hubertus Wilhelmus Albertus Dries, Amsterdam (NL); Sebastiaan Christoffel Van Der Heijden, Amsterdam (NL); Jason Andrew Horwege, The Woodlands, TX (US); Anthony Wolfert, Amsterdam (NL)

(73) Assignee: Shell Oil Company, Houston, TX (US)

( * ) Notice: Subject to any disclaimer, the term of this patent is extended or adjusted under 35 U.S.C. 154(b) by 230 days.

(21) Appl. No.: 12/376,523

(22) PCT Filed: Aug. 6, 2007

(86) PCT No.: PCT/EP2007/058138
§ 371 (c)(1),
(2), (4) Date: Feb. 5, 2009

(87) PCT Pub. No.: WO2008/017660
PCT Pub. Date: Feb. 14, 2008

(65) Prior Publication Data
US 2010/0034711 A1    Feb. 11, 2010

Related U.S. Application Data

(60) Provisional application No. 60/821,787, filed on Aug. 8, 2006.

(51) Int. Cl.
*C10G 11/18* (2006.01)
(52) U.S. Cl. ........ 422/241; 422/140; 422/145; 422/214; 422/215; 422/224
(58) Field of Classification Search ............... 422/140, 422/145, 214, 215, 224, 241
See application file for complete search history.

(56) References Cited

U.S. PATENT DOCUMENTS

| | | | | |
|---|---|---|---|---|
| 3,353,925 | A | 11/1967 | Baumann et al. | 23/288 |
| 4,753,780 | A | 6/1988 | Bowen | 422/214 |
| 5,552,119 | A | 9/1996 | Holmes | 422/144 |
| 5,580,241 | A * | 12/1996 | Koeberle | 432/58 |
| 5,851,380 | A | 12/1998 | Wells | 208/158 |
| 6,511,635 | B2 | 1/2003 | Mauleon et al. | 422/145 |
| 6,596,242 | B1 | 7/2003 | Dries | 422/139 |

FOREIGN PATENT DOCUMENTS

| | | |
|---|---|---|
| EP | 1800741 | 6/2007 |
| WO | WO9425148 | 11/1994 |
| WO | WO0229344 | 4/2002 |

OTHER PUBLICATIONS

International Search Report dated Nov. 13, 2007 (PCT/EP2007/058138).
Heijden, et al. "Modular Cold Wall HIB-ring design", Jul. 4, 2006.

* cited by examiner

*Primary Examiner* — Walter D Griffin
*Assistant Examiner* — Huy-Tram Nguyen
(74) *Attorney, Agent, or Firm* — Charles W. Stewart

(57) ABSTRACT

Catalytic cracking riser reactor extending between an inlet for hydrocarbonaceous feed and catalyst particles and an outlet for discharging cracked products and spent catalyst particles, which riser reactor has been provided with at least one contacting device, wherein the contacting device comprises a composite of refractory material and a metal structure, which metal structure is connected to the outer wall of the riser reactor. If more contacting devices have been provided, they are preferably axially spaced apart and are disposed along the inner surface of the riser reactor.

10 Claims, 2 Drawing Sheets

CATALYTIC CRACKING RISER REACTOR

PRIORITY CLAIM

The present application claims priority of U.S. Provisional Patent Application No. 60/821,787 filed 8 Aug. 2006.

FIELD OF THE INVENTION

The present invention relates to a catalytic cracking riser reactor. More specifically it relates to a riser reactor that has been provided with contacting devices.

BACKGROUND OF THE INVENTION

Catalytic cracking is a well-know process that is being used in many refineries. In catalytic cracking a hydrocarbon feedstock is fed to a riser reactor into which also a cracking catalyst is fed. During the residence time in the riser reactor the hydrocarbon feedstock is being cracked into lighter products. Since the cracking reaction occurs at high temperatures the riser reactor is usually provided with insulation. Such insulation may be provided at the outside of the steel outer wall of the riser reactor. It is also possible to provide for a refractory lining inside the reactor which lining protects the steel outer wall from the erosive effect of the reaction mixture. At the same time it provides a layer of insulation to keep the outer wall cool. At cracking also some coke is being formed that deposits onto the cracking catalyst to yield spent catalyst. At the top of the riser reactor the product stream is separated from the spent catalyst, and the spent catalyst is then regenerated by burning off the coke using a regenerating gas. The regenerated catalyst is subsequently recycled to the riser reactor. The heat for the catalytic cracking reaction is supplied by the regenerated catalyst. The product stream of the catalytic cracking process is separated into various fractions, such as $C_{4-}$-alkanes and $C_{4-}$-olefins, naphtha, distillate oils and cycle oils in a fractionation column.

In the riser reactor the average linear gas velocity may be in the range of 10 to 30 m/s and the average velocity of the catalyst particles may be up to 25 m/s. The catalyst particles will move substantially co-currently with the gaseous reaction mixture. As the cracking reaction takes place on the catalyst particles, it is highly desirable that there is a good contact between the catalyst particles and the gaseous reaction mixture. Therefore, it has been proposed in U.S. Pat. No. 3,353,925 to provide the riser reactor with venturi-shaped contact devices. These contact devices have the shape of an annulus. These devices are basically narrowed portions of a refractory lining that is present anyway in the riser reactor.

It has further been found that the catalyst particles tend to flow in a core-annular flow pattern. This means that there are areas of dense catalyst concentration in the periphery of the riser reactor whilst leaving a diluted catalyst area in its centre. This has been acknowledged in U.S. Pat. No. 5,851,380. Such a flow pattern leads to inhomogeneous distribution of catalyst particles and sub-optimal conversion of the hydrocarbon feedstock. To solve this disadvantage it was proposed to provide the riser reactor with annular contact devices which create a turbulence and thereby a more homogeneous distribution of the catalyst particles. These contact devices may be arranged in any suitable means, but the description in U.S. Pat. No. 5,851,380 specifically discloses a piece of refractory in the desired shape interposed within the refractory lining of the riser reactor.

From the disclosures in the prior art it is evident that the mixture of hydrocarbon feed and catalyst particles provide a highly erosive environment. Therefore, the known contact devices are executed in refractory material. However, the cracking environment is also very hot. Temperatures between 480 and 640° C. are common. In these hot erosive environments there is the risk that the contact devices change in shape due to erosion and/or temperature effects. It is therefore desirable to fix the contact devices in such a way that these effects are minimised. Although U.S. Pat. No. 5,851,380 indicates that the disclosed contact devices may be attached to the riser reactor in any known way, no specific teaching as to what way one should chose has been provided. The solution disclosed refers to the interposition of a piece of refractory material with the refractory lining that is anyway present in the riser reactor. It has now been found that a more secure way to connect contact devices is provided by the use of a metal structure that is connected to the outer wall of the riser reactor.

SUMMARY OF THE INVENTION

Accordingly, the present invention provides a catalytic cracking riser reactor extending between an inlet for hydrocarbonaceous feed and catalyst particles and an outlet for discharging cracked products and spent catalyst particles, which riser reactor has been provided with at least one contacting device, wherein the contacting device comprises a composite of refractory material and a metal structure, which metal structure is connected to the outer wall of the riser reactor.

Due to the present solution the contact device is securely fastened to the outer wall of the riser reactor. This ensures that the location of the contact device does not change during operation despite temperature shocks. Further, the metal structure provides reinforcement to the combination of a metal structure and refractory material so that it becomes stronger and less prone to erosion. This is particularly advantageous when the riser reactor has been provided with an internal refractory lining. In such a case the steel outer wall of the riser reactor is relatively cold and the effect of temperature shocks most prominent.

The contacting device may in addition be used for protection of other tools that need to be placed inside the riser reactor. Such tools include thermocouples and other measurement tools. Advantageously, such a tool is positioned downstream of a contacting device, thereby being protected against the erosive effect of the mixture of catalyst particles and gaseous reactants.

When a plurality of contacting devices is being considered, such contacting devices are suitably axially spaced apart and are disposed along the inner surface of the riser reactor. When more than one contacting devices are being used the skilled person may determine how many and at what distance he wants to provide these contacting devices along the wall of the riser reactor. Such number and distance depend i.a. on the velocity and loading in the riser reactor and its length. It is therefore within the skill of the skilled person to determine such number and distance. The axial distance of the contacting devices is suitably at least one time the internal diameter of the riser reactor. Generally, the distance does not exceed 10 times the internal diameter, and is, preferably not more than four times the internal diameter. More preferably, the distance between two contacting devices is from 1.1 to 2 times the internal diameter of the riser reactor.

BRIEF DESCRIPTION OF THE DRAWINGS

The invention will now be described in more detail with reference to the figures.

DETAILED DESCRIPTION OF THE INVENTION

Figure 1:
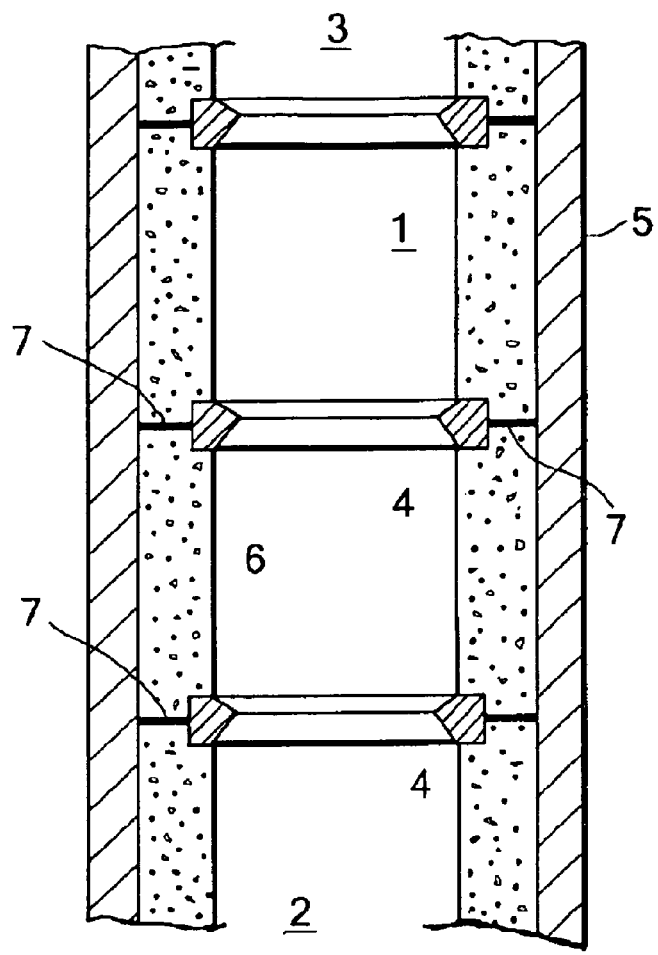
FIG. 1 shows a schematic drawing of the riser reactor according to the present invention.

The contact devices may be of any shape that the skilled person would want. The skilled person will optimise the advantages, in particular the turbulence effects, whilst minimising any disadvantage, such as pressure drop. In view of the symmetry, an annular contact device is very suitable. However, also contact devices in the shape of a segment of an arc, as disclosed in U.S. Pat. No. 6,596,242 are very suitable.

The contacting devices will reduce the passageway in the riser reactor. Preferably, the passageway is reduced by not more than 15 per cent, based on the passageway of the riser reactor upstream of the contacting device. Suitably, the reduction of the passageway is at least 2 per cent. This range ensures a good turbulence of the catalyst particles and the gaseous reaction mixture, whereas the process does not suffer from a high pressure drop.

The skilled person will realise that the metal structure that is fixed to the outer wall constitutes a potential heat leakage to the outer wall. Due to the heat conductivity of the metal structure the outer wall to which it is connected will also be exposed to local heating. To minimise the risk for this to happen the number of metal structure that are to be connected to the outer wall is preferably kept minimal. In practice, the number of metal structures connected to the outer wall ranges from 1 to 25. One structure may be sufficient when a contacting device in the shape of a segment as disclosed in U.S. Pat. No. 6,596,242 is being used. When an annulus as disclosed in U.S. Pat. No. 5,851,380 is being used, the number of metal structures may suitably range from 4 to 25.

When the contacting device is having the shape of an annulus, the whole annulus may be assembled in one piece. However, it is advantageous to assemble such an annulus in more than one module. This is not only easier to assemble, but it also provides the possibility of local repair. When a part of an annulus is damaged by whatever cause only the relevant module can then be repaired or replaced without the need to replace a major part of the lining. It will be evident that this feature represents a major advantage over the prior art as represented by U.S. Pat. No. 3,353,925 where the contact device forms part of the riser reactor lining or over the prior art as represented by U.S. Pat. No. 5,851,380 where the ring has to be cut out of the existing lining and a new ring of refractory material has to be neatly fit in the existing lining. The number of modules to some extent depends on the number of metal structures the skilled person wants to connect to the outer wall. The number of modules suitably ranges from 4 to 25.

The metal structure fulfils two purposes; it provides secure fixation to the outer wall and reinforcement to the refractory material. These purposes are preferably achieved by metal structures in the shape of a multi-toothed fork. Forks with 2 to 8, preferably from 3 to 6 teeth are very suitable. By the use of such structures the number of attachments to the outer wall is limited, whereas the reinforcing of the refractory using the multitude of teeth is ensured. The attaching of the structures to the outer wall can be done in any suitable way, suitably by screwing or welding. It is possible to manufacture the metal structure out of one piece. On the other hand it is also possible to construe the metal structure out of a separate support strip that is being connected to the outer wall and connect this support strip to a further metal structure, such as a multitude of teeth, that is reinforcing the refractory. If the latter option is chosen it enables the skilled person to select the best possible material for the purpose of connecting the support strip most strongly to the reactor outer wall and the best metal for the teeth, e.g., with regard to it expansion behaviour at temperature changes. So whereas the outer wall of the riser reactor may be construed from carbon steel, the support strip and/or the teeth and/or the entire metal structure may be construed from stainless steel, although other material is also possible.

The shape of the metal structure is preferably such that over a significant area it is in contact with the refractory material. Thereto, the teeth are advantageously executed as metal loops. Other shapes, such as metal plates, multi-pronged comb-like structures etc. are also possible. Even more preferably, the teeth are in the shape of a polygon, wherein a triangle or truncated triangle extends from the outer wall. The result is that when such contact devices are used the erosive mixture of hot feedstock and catalyst does not impact perpendicularly on the contact device, but contacts the contact device in a more gradual fashion. Thereby the erosive effect of the contact with the contact device is reduced. Good results are obtained with contact devices that are positioned under an angle of 15 to 65° with the original lining.

To improve the strength of the connection between the metal structure and the refractory material the metal structures, and more in particular the teeth referred to above have preferably been provided with hooks or lips extending from the metal structures. These tend to hold the refractory material like fingers, thereby holding the material even more strongly. One suitable way of creating these hooks or lips is by punching the structures or teeth.

The teeth may be placed parallel to the flow direction in the riser reactor, which is parallel to the axis of the riser reactor. To augment to contact surface with the refractory material and the teeth, and to reduce the erosive effect on the teeth, the teeth are preferably positioned at an angle with the axis of the reactor. Suitably such angle ranges from 5 to 45° with the axis.

In view of the erosive nature of the riser reactor mixture the refractory material is suitably selected such that it is highly wear resistant. The material is preferably also castable to facilitate the shaping of the contact devices. Suitably the refractory material is selected from the group consisting of alumina, silica, calcium oxide, titanium oxide, magnesium oxide, iron oxide and mixtures thereof. Also the refractory may contain phosphorus oxide. Commercial examples of satisfactory refractory materials include the products from the Actchem series, such as Actchem 45, (ex Actchem) and products from the Rescocast and Rescobond series, such as Rescobond AA-22, (ex Resco Industries) or products from the Pliline series (ex Imerys).

The material from which the metal structures are prepared may be iron or preferably steel. Whereas the outer wall of the riser reactor may be construed from carbon steel, the metal structure is preferably made out of stainless steel.

The invention will now be described in more detail with reference to the figures.

FIG. 1 shows a schematic drawing of the riser reactor according to the present invention.

Figure 2:
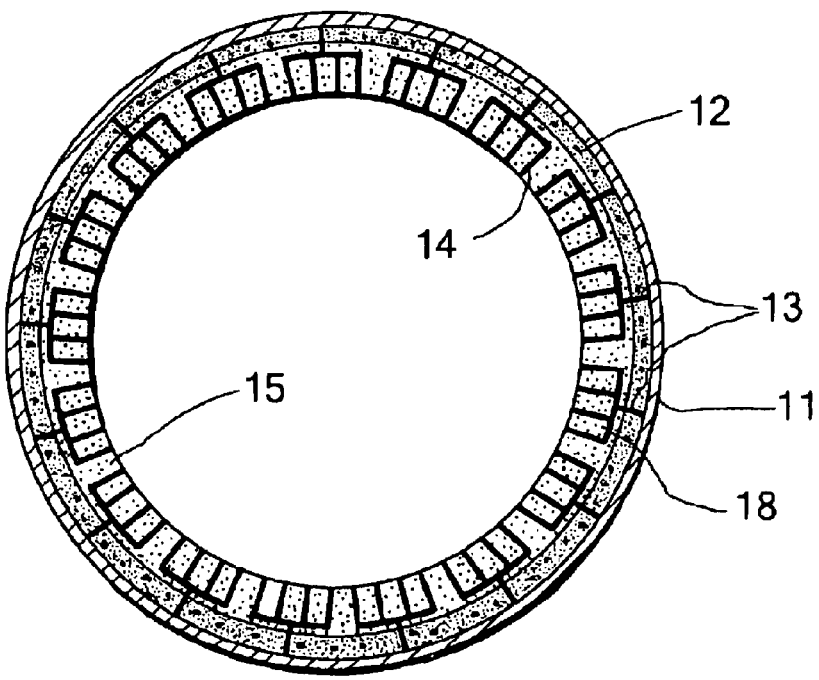
FIG. 2 shows a cross-section of a riser reactor with lining material and contact devices.

FIG. 2 shows a cross-section of a riser reactor with lining material and contact devices.

Figure 3:
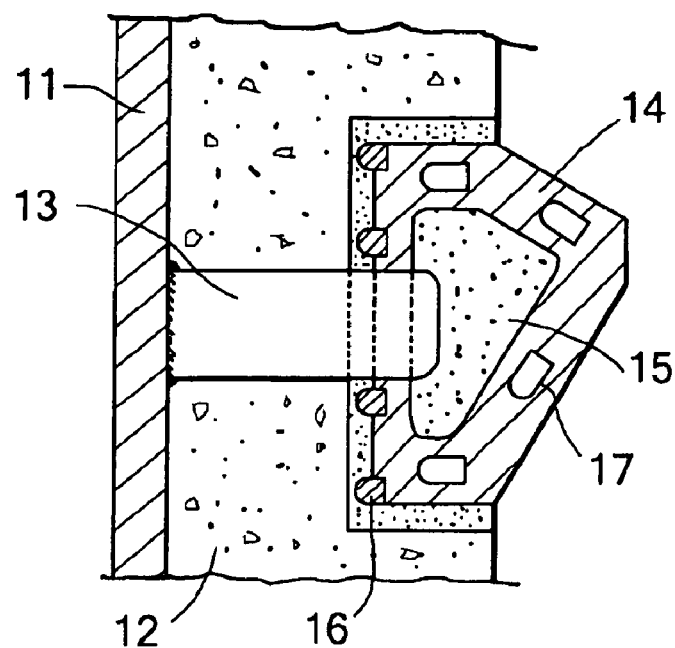
FIG. 3 shows a more detailed drawing of the contact device according to the present invention.

FIG. 3 shows a more detailed drawing of the contact device according to the present invention.

Figure 4:
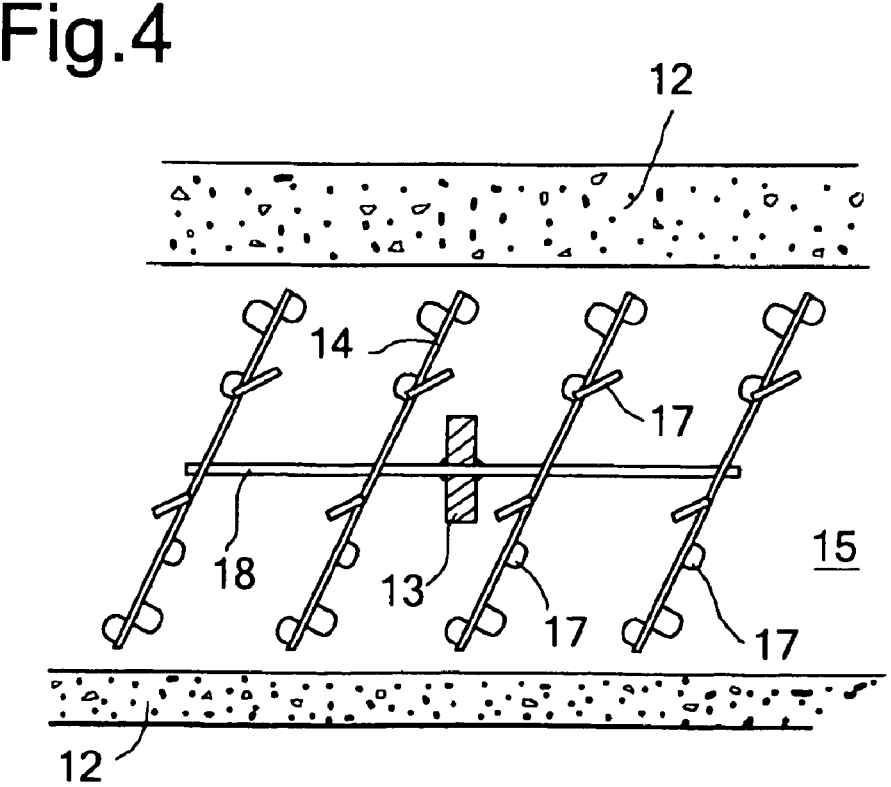
FIG. 4 shows a front view of the contact device shown in FIG. 3.

FIG. 4 shows a front view of the contact device shown in FIG. 3.

In FIG. 1 a riser reactor 1 is shown with an inlet for cracking catalyst and hydrocarbonaceous feed 2. The skilled person will realise that usually the catalyst and the hydrocarbonaceous feed are fed into the riser reactor via separate inlets. However, for the purpose of this invention the inlet is constituted of the combined entrance of the catalyst and feed. Cracked products and spent catalyst leave the riser reactor 1 via outlet 3. The reactor 1 is provided with contact devices 4, which are axially spaced apart. The contact devices in the figure are annuli that provide a restriction in the cross-section of the riser reaction. The riser reactor 1 is further provided with a refractory lining 6 along outer wall 5 of the reactor. The contact devices 4 are connected to the outer wall via metal support strips 7. For a more detailed view of the contact device reference is made to FIGS. 2, 3 and 4.

FIG. 2 shows a cross-section of a riser reactor having an outer wall 11. Around the outer wall 11 a lining 12 of refractory has been placed to insulate the hot interior from the cold outer environment. Attached to the outer wall are metal support strips 13. Each support strip 13 is connected on the one end with the outer wall 11 and on the other end to a fork-type metal structure comprising a metal bar 18 to which four teeth 14 have been attached. The fork-type structure 14 is embedded in a second refractory material 15. The refractory 15 can be composed of several modules, one module per fork. In case of damage of one or a few of the modules, it is easy to replace the damaged modules.

FIG. 3 shows a part of outer wall 11 and refractory lining 12. It further shows support strip 13 attached to the outer wall. The teeth 14 of the metal structure have the shape of a loop. The metal loop is embedded in refractory material 15. The cross-section of the contact device is shaped as a truncated triangle as shown in FIG. 3. This will allow that the impact of the flow of the erosive mixture of catalyst and feedstock is forced towards the centre of the riser reactor under an angle of about 30°, thereby reducing the erosive effect. The figure also shows the lips 16 which extend from the loop 14 to improve the connection to refractory material 15. At several places loop 14 has been punched thereby creating on the one hand holes and at the in other hand further lips 17 as shown in FIG. 4.

FIG. 4 is a front view of the module shown in FIG. 3. It shows the support strip 13 and the metal loops 14 embedded in refractory material 15 and connected with each other via a metal bar 18. It further shows the other refractory lining 12. In FIG. 4 it is clearly shown that the punched loops 14 comprise a number of lips 17. It further shows that the loops 14 may be positioned at an angle to the vertical axis of riser reactor 1. In the figure the angle is about 20°.

It is clear that although the shown module contains four teeth, modules with more or fewer teeth are equally possible.

That which is claimed is:

1. A catalytic cracking riser reactor having a riser reactor wall, an internal diameter, and extending between an inlet for hydrocarbonaceous feed and catalyst particles and an outlet for discharging cracked products and spent catalyst particles, which the riser reactor has been provided with an internal refractory lining and a contacting device, wherein the contacting device comprises: a composite of refractory material and a metal structure, wherein the metal structure comprises two or more metal teeth means for providing reinforcement to the refractory material; and metal bar means for connecting the two or more metal teeth means with support strip means for connecting the metal bar means and the two or more metal teeth means with the riser reactor wall.

2. Reactor according to claim 1, wherein the riser reactor is further provided with a plurality of the contacting devices that are axially spaced apart and disposed along the inner surface of the riser reactor.

3. Reactor according to claim 1, wherein the contacting device is selected from a segment of an arc and an annulus.

4. Reactor according to claim 1, wherein the metal structure has the shape of a multi-toothed fork.

5. Reactor according to claim 1, wherein the refractory material has been selected from the group consisting of silica, alumina, calcium oxide, titanium oxide, iron oxide, magnesium oxide and mixtures thereof.

6. A riser reactor according to claim 1, wherein the two or more metal teeth means includes those selected from the group consisting of a loop shape, a plate shape, a polygon shape, a triangle shape, and a truncated triangle shape.

7. A riser reactor according to claim 6, wherein the two or more metal teeth means includes a loop shape which is embedded within the refractory material.

8. A riser reactor according to claim 7, wherein the riser reactor further includes a plurality of the contacting devices that are axially spaced apart by of at least one time the internal diameter but not exceeding 10 times the internal diameter of the riser reactor.

9. A riser reactor according to claim 8, wherein the riser reactor has a riser reactor axis, and wherein the two or more metal teeth means are oriented at an angle with the riser reactor axis.

10. A riser according to claim 9, wherein the refractory material has been selected from the group consisting of silica, alumina, calcium oxide, titanium oxide, iron oxide, magnesium oxide and mixture thereof.

* * * * *